(12) United States Patent
Pflughaupt

(10) Patent No.: US 8,902,165 B1
(45) Date of Patent: Dec. 2, 2014

(54) CURSOR CONTROL DEVICE WITH INTEGRATED SCROLL RING

(75) Inventor: Jaycob D. Pflughaupt, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 456 days.

(21) Appl. No.: 13/114,376

(22) Filed: May 24, 2011

(51) Int. Cl.
*G06F 3/033* (2013.01)

(52) U.S. Cl.
USPC .......... 345/167; 345/156; 345/157; 345/164; 345/163; 345/161

(58) Field of Classification Search
None
See application file for complete search history.

(56) References Cited

U.S. PATENT DOCUMENTS

| | | | |
|---|---|---|---|
| 6,525,714 B1* | 2/2003 | Varga et al. | 345/164 |
| 6,825,831 B1* | 11/2004 | Passaro | 345/167 |
| 2006/0125785 A1* | 6/2006 | McAlindon | 345/156 |
| 2010/0168962 A1* | 7/2010 | Imamura | 701/41 |

OTHER PUBLICATIONS http://softsolder.com/2009/08/09/kensington-expert-mouse-trackball-scroll-ring-troubles/—The Smell of Molten Projects in the Morning—Kensington Expert Mouse Trackball: Scroll Ring Troubles—Posted Aug. 9, 2009.
http://www.amazon.com/Kensington-K72337US-Orbit-Trackball-Scroll/dp/B002OOWB30—Amazon.com: Kensington K72337US Orbit Trackball with Scroll Ring for PC or MAC—Date first available at Amazon.com: Oct. 17, 2009.

* cited by examiner

*Primary Examiner* — Joseph Haley
*Assistant Examiner* — Ifedayo Iluyomade
(74) *Attorney, Agent, or Firm* — Angel N. Gerdzhikov; Donna P. Suchy; Daniel M. Barbieri

(57) ABSTRACT

A scrolling device is provided to scroll display content on a display device. The scrolling device includes a scroll ring with a sensor mechanically coupled to the scroll ring and adapted to generate an input signal for controlling the display device as a function of an angular displacement of the scroll ring. A portion of the scroll ring is circumscribed by a ring gear that is engaged by a pinion gear attached to the sensor. As the scrolling device is rotated, the ring gear rotates, which rotates the pinion gear to drive the sensor, which can be a potentiometer. A controller is adapted to receive the input signal from the sensor and select between predetermined segments in the display content or select between a plurality of pages of display content.

14 Claims, 3 Drawing Sheets

CURSOR CONTROL DEVICE WITH INTEGRATED SCROLL RING

BACKGROUND

The present disclosure relates to a scrolling device for use with a cursor control device for a computer system.

There are a number of computer input devices that contain optical devices for cursor movement and scrolling. Typically, an optical sensor and a light emitting diode are configured to convert reflected light into electrical signals. The electrical signals are encoded into information that a computer can use, such as cursor X-Y position data or scrolling direction and distance.

In an avionics environment, any electronic device can potentially interfere with navigational equipment. The Federal Avionics Administration (FAA) therefore, requires new and untested electronic devices to undergo stringent testing before they can be employed in the avionics environment. This means that an optical scrolling device useful in land-based applications is not usable in the avionics environment until proven against the stringent FAA standards.

SUMMARY

To overcome the problems of the known prior art, the present invention proposes an electro-mechanical solution for an improved computer input device, such as a scrolling function for a cursor control device that can be immediately deployed in the avionics environment without being subject to the FAA's testing requirements.

A scrolling device is provided to scroll display content on a display device. The scrolling device includes a scroll ring with a sensor mechanically coupled to the scroll ring and adapted to generate an input signal for controlling the display device as a function of an angular displacement of the scroll ring. A portion of the scroll ring is circumscribed by a ring gear that is engaged by a pinion gear attached to the sensor. As the scrolling device is rotated, the ring gear rotates, which rotates the pinion gear to drive the sensor. A controller is adapted to receive the input signal from the sensor and select between predetermined segments in the display content or select between a plurality of pages of display content.

In another embodiment, a scrolling device for use with a computer system is provided. A cursor controller includes a trackball held in a retainer. The trackball is rotatable with respect to the retainer in order to move a cursor on a display device for the computer system. A display device for the computer system is operable by a gear positioned generally near the trackball and movable with respect to the trackball assembly. The gear engages a pinion gear, which is mechanically coupled to a sensor by a pinion shaft. The sensor generates an input signal for controlling the display device as a function of angular displacement of the pinion gear.

DESCRIPTION OF THE ILLUSTRATIVE EMBODIMENTS

Figure 1:
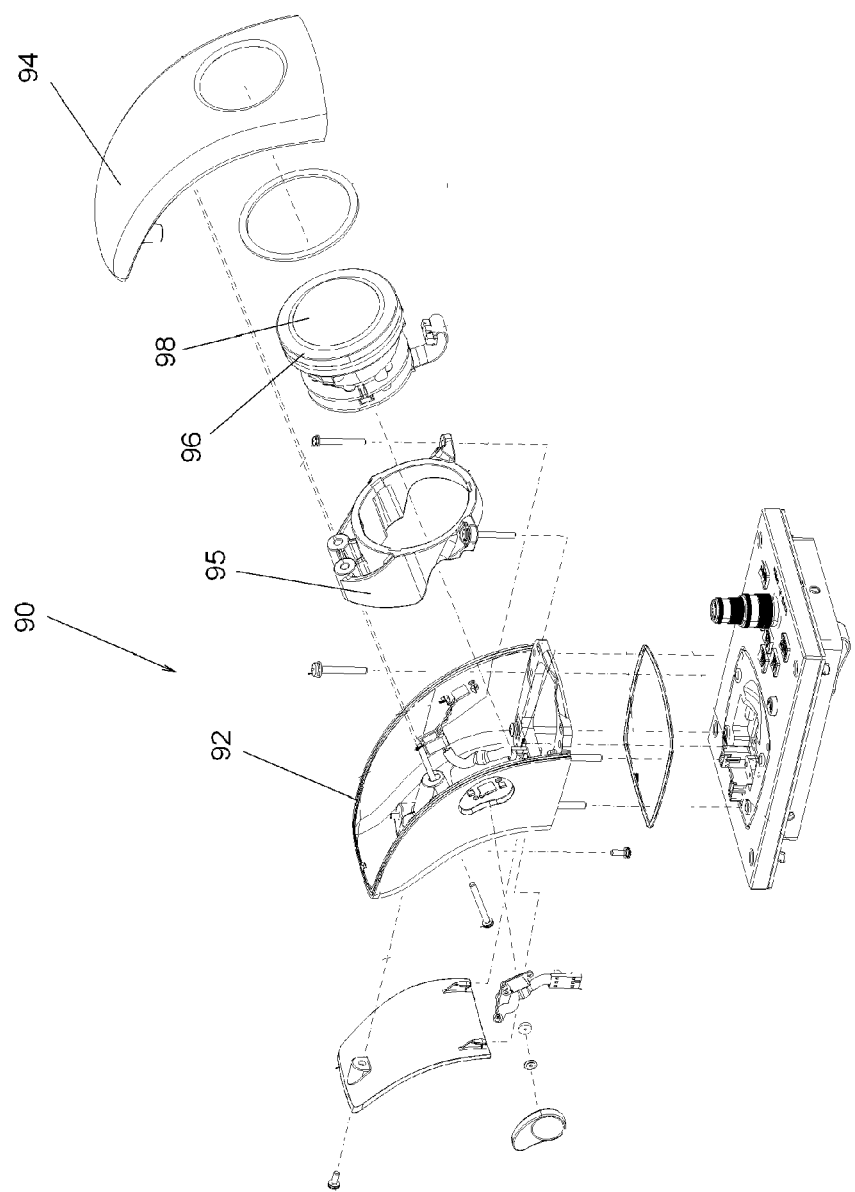
FIG. 1 (Prior Art) is an exploded perspective view of a cursor control device of the prior art.

FIG. 1 (Prior Art) illustrates a cursor controller 90 of the prior art manufactured by Rockwell Collins, Inc. Cursor controller 90 includes a housing 92 and a cover 94. An adapter fixture 95 is used to mount a trackball assembly 96 in housing 92. Adapter fixture 95 can be configured as necessary to mount different types of trackball assemblies within housing 92. In one embodiment, trackball assembly 96 can be manufactured by Cursor Controls, Ltd. Trackball assembly 96 includes a trackball 98, a top portion of which protrudes from cover 94 when cover 94 is installed on housing 92, to allow a user to rotate trackball 98. Rotation of trackball 98 is translated into a cursor-positioning signal corresponding to X-Y motion of a cursor on a display device 106 of a computer system.

Figure 2:
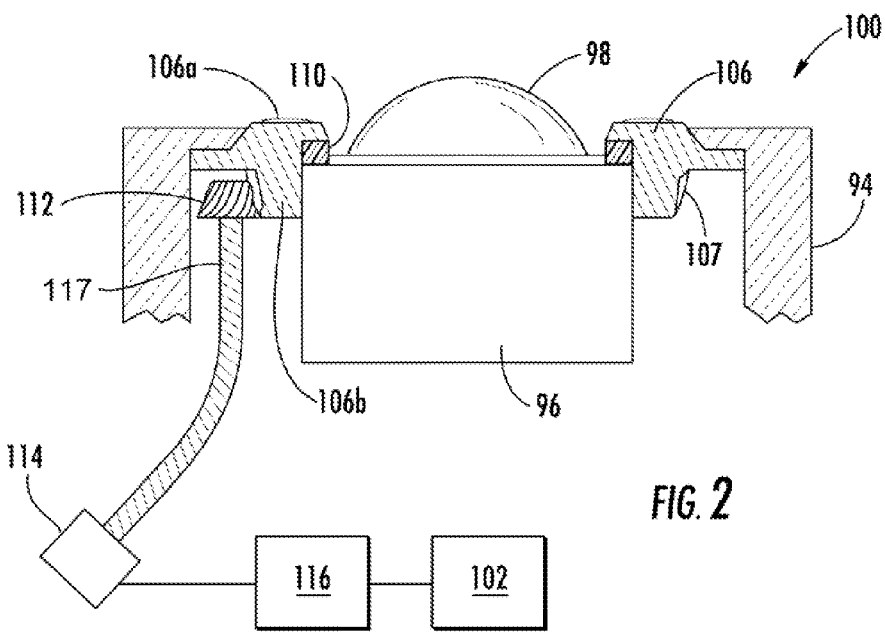
FIG. 2 is a partial sectional view of a first embodiment of the cursor control device with a scroll ring fitted therein.

FIG. 2 is a cross-sectional view of a first embodiment of the present invention, cursor controller 100. Cursor controller 100 includes trackball assembly 96, and additionally, a rotating scroll ring 106 positioned around trackball 98. Scroll ring 106 can be selectively used for both moving a cursor displayed on a display device 102, as well as for scrolling display content, moving between segments on a display screen, and/or choosing between multiple display screens 300a-d (see FIG. 4).

An upper portion 106a of scroll ring 106 extends above cover 94 and can have a tactile surface to more easily allow a user to more positively engage and rotate scroll ring 106. A lower portion 106b of scroll ring 106 extends below cover 94 within housing 92. A portion of the lower portion 106b is circumscribed by a plurality of teeth forming a ring gear 107.

A friction reducing element 110 is positioned between upper portion 106a of scroll ring 106 and trackball assembly 96. The friction reducing element 110 can be constructed from any material to ease rotation of scroll, ring 106, and under some circumstances, can be omitted. In the preferred embodiment, friction reducing element 110 is made of Teflon® manufactured by E. I. du Pont de Nemours and Company. Other materials, or constructions, even including bearings such as needle bearings, can be used.

Figure 3:
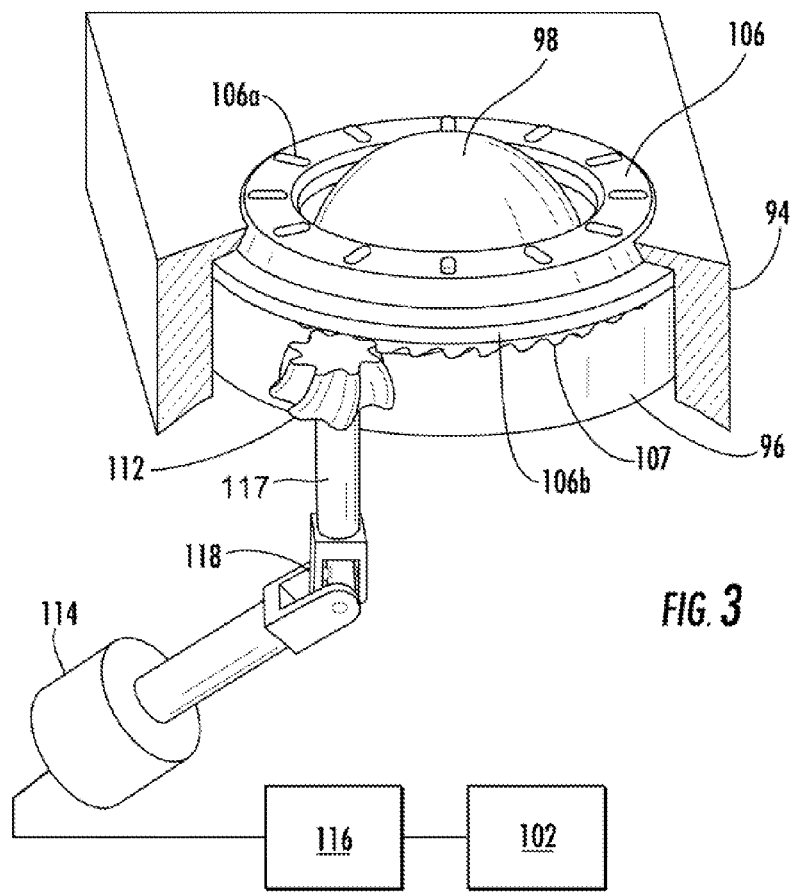
FIG. 3 illustrates a partial cut-away perspective and schematic view of a second embodiment of the cursor control device with a scroll ring fitted therein.

A pinion gear 112 is positioned and rotationally retained in housing 92 to engage ring gear 107. Ring gear 107 and pinion gear 112 cooperate to translate rotary motion from scroll ring 106 to rotary motion of a sensor 114. A flexible pinion shaft 117 connects pinion gear 112 to sensor 114 to drive sensor 114. Flexible pinion shaft 117 allows angling of sensor 114 with respect to pinion gear 112 to provide a desired positioning of sensor 114 with respect to the other components. In an alternative embodiment, as shown in FIG. 3, a universal joint 118 can be provided in pinion shaft 117. Alternatively, pinion shaft 117 can be a non-flexible straight shaft or pinion gear 112 can be directly attached to sensor 114.

Sensor 114 can be fixed to housing 92, adapter fixture 95 or to other components. In an alternative embodiment, sensor 114 can be driven by scroll ring 106 in alternative manners, such as by pulleys and one or more drive belts, by a flexible shaft, by a gear train, by a chain mechanism and by other mechanisms. Sensor 114 can be a potentiometer that generates an input signal as a function of an angular displacement of ring gear 107. Sensor 114 can also be a different type of sensor.

FIGS. 2 and 3 also show a partial schematic view of cursor controller 100 in a computer system environment, and particularly in an avionics computer environment. Scroll ring 106 and ring gear 107 can be seen engaging pinion gear 112 to drive sensor 114. A controller 116 is provided to receive and process the input signal from sensor 114. From the input signal, the processing circuitry of controller 116 determines positioning of display content on display device 102. The cursor-positioning signal and input signal cooperate through operation of processing circuitry and/or software of controller 116 to provide input data to display device 102 representing a unique point for the cursor and position of the display content on display device 102. The cursor positioning signal from the trackball 98 thus positions the cursor at a unique point on display device 102. The input signal derived from the rotational motion of scroll ring 106/sensor 114 enables controller 116 to move through long pages or toggle through segments (which can correspond to a menu lists) depicted on display device 102.

Controller 116 is intended to represent a broad category of computer hardware systems, including but not limited to general-purpose computer systems based on the Pentium® processor manufactured by Intel Corporation of Santa Clara, Calif., as well as any other suitable processor. Furthermore, various kinds of software may be stored in controller 116, such as an operating system and software drivers, including the cursor control, scroll ring, and display driver software. A display driver may be controlled by the operating system on controller 116 to display various kinds of information on display device 102.

The scroll ring driver software can be installed in controller 116, and the input signal from sensor 114 is sent to the scroll ring driver software residing in controller 116. The scroll ring driver software can generate from the input signal, an intermediate signal and notify the operating system also residing in controller 116.

Scroll application software residing in controller 116 and loaded into the operating system processes the intermediate signal received form the scroll ring driver software. The scroll application software may be configured for scrolling through long pages, selecting between one or more segments (which can correspond to a menu lists) on display device 102, or move between one or more display screens 300a-d.

Figure 4:
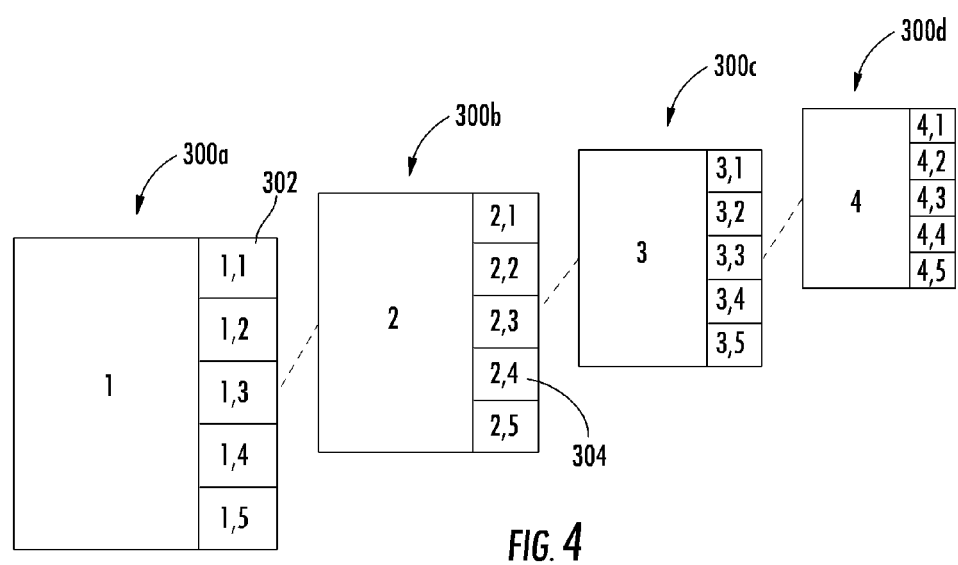
FIG. 4 illustrates four display pages of display content residing on a display device with each display page having multiple segments.

FIG. 4 illustrates four different display pages 300a-d of display content. Display pages 300a-d have preprogrammed segment boundaries numbered 1-5. The positioning of display pages 300a-d and selection of corresponding segments can be, derived by positioning of sector boundaries corresponding to scroll ring 106. For instance, scroll ring 106 can be operatively divided into four 90-degree sectors. Each sector can be further divided into additional segments, here, five segments. Thus, segment boundary 302 is defined by sector 1 segment 1. Similarly, segment boundary 304 is defined by sector 2 segment 4. Depending on the software configuration, the distinct sectors can allow a user to move between display pages 300a-d or select between menu items on each display page 300a-d. It will be appreciated that other, similar approaches may be applied corresponding to the number of sectors and segments that are desired. This form of operation by scroll ring 106 can be selected, or another form of operation alternatively selected via input buttons on the curser controller 100 or in other manners.

The instant disclosure is directed toward an electro-mechanical device for scrolling on display device 102. This proves particularly useful in avionics applications where the addition of electronically operated components can be troublesome due to electromagnetic interference with sophisticated aircraft electronics. An electro-mechanical solution, however, that interfaces with pre-existing controller 116, does not add new electromagnetic interference to the avionics environment, and therefore can be immediately deployed.

In an alternative embodiment, ring gear 107 is replaced with a linear gear track protruding in front or behind trackball 98. It should be understood by those skilled in the art that various other modifications or alterations of the mechanical mechanism to translate mechanical motion into an electrical signal could be employed. Selection of screens and segments can be based on rotational speed of scroll ring 106. For example, to move to a different screen a user can spin scroll ring 106 quickly and the software will recognize that the increased speed of scroll ring 106 indicates that the user desires to move between pages of display content rather than up and down a single page on the display.

Each of the components found in one of the embodiments of the present invention, as well as in the prior art version of FIG. 1, can be the same as the components of the prior art version, or can be modified or different than the corresponding components of the prior art version. Various aspects of the various embodiments can be combined in different combinations to create different embodiments within the scope of the invention.

While the present invention has been particularly shown and described with reference to exemplary embodiments thereof, it should be understood by those of ordinary skill in the art that various changes, substitutions and alterations could be made herein without departing from the scope of the invention as defined by appended claims and their equivalents.

What is claimed is:

1. A scrolling device for use with a display device to scroll a display content on the display device, the scrolling device comprising:
   a trackball assembly having a trackball for controlling the display device;
   a scroll ring surrounding a portion of the trackball for rotating with respect to the trackball and moving independently of the trackball;
   a ring gear circumscribing a portion of the scroll ring;
   a sensor mechanically coupled to the scroll ring and adapted to generate an input signal for controlling the display device as a function of an angular displacement of the scroll ring;
   a pinion gear engaging the ring gear such that rotation of the ring gear causes rotation of the pinion gear;
   a pinion shaft extending from the pinion gear; and
   a universal joint attaching the pinion shaft to the sensor for driving the sensor and to angle the sensor away from the pinion shaft.

2. The scrolling device of claim 1, wherein the pinion shaft further comprises a first portion and a second portion at an angle with respect to the first portion and attached to the sensor, wherein the universal joint attaches the first portion to the second portion.

3. The scrolling device of claim 2, and further comprising:
   a friction reducing element positioned between the scroll ring and the trackball assembly for reducing friction between the scroll ring and the trackball assembly.

4. The scrolling device of claim 3, wherein the friction reducing element is made of Teflon®.

5. The scrolling device of claim 4, and further comprising a controller, wherein the controller is configured to perform at least one of the following operations based on the input signal, select between predetermined segments in the display content and select between a plurality of pages of display content.

6. The scrolling device of claim 1, wherein the sensor is a potentiometer.

7. The scrolling device of claim 1, and further comprising:
a controller, where the controller is configured to perform at least one of the following operations based on the input signal, select between predetermined segments in the display content and select between a plurality of pages of display content.

8. A scrolling device for use with a display device to scroll a display content on the display device, the scrolling device comprising:
a trackball for controlling the display device;
a scroll ring positioned for manipulation by a user, the scroll ring having a ring gear surrounding a portion of the trackball, wherein the scroll ring and the ring gear are rotatable with respect to the trackball for independent movement with respect to the trackball;
a pinion gear engaged with the ring gear such that rotation of the scroll ring causes rotation of the pinion gear;
a pinion shaft extending from the pinion gear;
a sensor adapted to generate an input signal for controlling the display device as a function of an angular displacement of the ring gear and pinion gear; and
a universal joint attached between the pinion shaft and the sensor for driving the sensor and to angle the sensor away from the pinion shaft.

9. The scrolling device of claim 8, wherein the pinion shaft further comprises a first portion and a second portion at an angle with respect to the first portion and connected to the sensor, wherein the universal joint attaches the first portion to the second portion.

10. The scrolling device of claim 9, and further comprising a trackball assembly having a trackball for moving a cursor on the display device and a friction reducing element positioned between the scroll ring and the trackball assembly, such that the scroll ring rotates substantially unrestricted with respect to the trackball assembly.

11. The scrolling device of claim 8, wherein the sensor is a potentiometer.

12. The scrolling device of claim 11, and further comprising a pinion shaft having a first portion and a second portion at an angle with respect to the first portion attaching the pinion gear to the potentiometer for driving the potentiometer.

13. A scrolling device for use with a computer system, comprising:
a cursor controller having a trackball assembly positioned in a housing, the trackball assembly having a trackball being rotatable with respect to a retainer in order to move a cursor on a display device for the computer system;
a scroll gear positioned generally near the trackball and movable by a user with respect to the trackball assembly for independently moving with respect to the trackball;
a pinion gear engaged with the scroll gear such that movement of the scroll gear causes rotation of the pinion gear;
a pinion shaft having a first portion connected to the pinion gear and a second portion;
a flexible coupling attaching the first portion of the pinion shaft to the second portion of the pinion shaft;
a sensor connected to the second portion of the pinion shaft to be mechanically coupled to the pinion gear and adapted to generate an input signal for controlling the display device as a function of an angular displacement of the scroll gear, wherein the sensor is angled away from the pinion gear.

14. The scrolling device of claim 13, and further comprising a controller configured to receive the input signal and scroll a display content on the display device based on the input signal; wherein the controller is configured to perform at least one of the following operations based on the input signal, select between predetermined segments in the display content and select between a plurality of pages of display content.

* * * * *